(12) United States Patent
Shimono et al.

(10) Patent No.: US 12,070,914 B2
(45) Date of Patent: Aug. 27, 2024

(54) MOLDING METHOD AND MOLDING JIG FOR LAMINATED BODY

(71) Applicant: MITSUBISHI HEAVY INDUSTRIES, LTD., Tokyo (JP)

(72) Inventors: Kodai Shimono, Tokyo (JP); Hiroshi Tokutomi, Tokyo (JP); Shoya Mano, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 474 days.

(21) Appl. No.: 17/312,024

(22) PCT Filed: Oct. 17, 2019

(86) PCT No.: PCT/JP2019/040894
§ 371 (c)(1),
(2) Date: Jun. 9, 2021

(87) PCT Pub. No.: WO2020/121648
PCT Pub. Date: Jun. 18, 2020

(65) Prior Publication Data
US 2022/0024159 A1    Jan. 27, 2022

(30) Foreign Application Priority Data
Dec. 10, 2018    (JP) ................ 2018-231137

(51) Int. Cl.
*B29C 70/54*    (2006.01)
*B29C 43/12*    (2006.01)
(Continued)

(52) U.S. Cl.
CPC .............. *B29C 70/54* (2013.01); *B29C 43/12* (2013.01); *B29C 43/3642* (2013.01);
(Continued)

(58) Field of Classification Search
CPC . B29C 70/44; B29C 2043/3602; B29C 70/54; B29C 70/446; B29C 70/541
See application file for complete search history.

(56) References Cited

U.S. PATENT DOCUMENTS 8,163,221 B2    4/2012    Suzuki et al.
8,454,876 B2    6/2013    Graeber
(Continued)

FOREIGN PATENT DOCUMENTS

EP    2116358 A1    11/2009
JP    H0542590 A    2/1993
(Continued)

OTHER PUBLICATIONS

International Search Report and Written Opinion of International Application No. PCT/JP2019/040894 mailed Nov. 19, 2019; 14pp.
(Continued)

*Primary Examiner* — Christopher T Schatz
(74) *Attorney, Agent, or Firm* — HAUPTMAN HAM, LLP (57) ABSTRACT

A method for molding a laminated body includes laminating a reinforced fiber base material on a molding surface of a molding jig to form a laminated body; attaching a pulling jig to a third lamination portion of the laminated body; forming a protrusive curvature part and a recessed curvature part in the laminated body by curving the laminated body along a protrusive curvature surface and a recessed curvature surface formed on the molding surface while pulling the end of the laminated body with the pulling jig; and densifying the laminated body by heating the curved laminated body while pressurizing the same. The reinforced fiber base material is laminated so that at least a part of a gap between layers of the reinforced fiber base material becomes a non-adhered (Continued)

state in a portion from the protrusive curvature part to the third lamination portion formed in the laminated body.

5 Claims, 5 Drawing Sheets (51) Int. Cl.
*B29C 43/36* (2006.01)
*B29C 70/44* (2006.01)
*B29K 105/08* (2006.01)

(52) U.S. Cl.
CPC ...... *B29C 70/44* (2013.01); *B29C 2043/3602* (2013.01); *B29C 2043/3657* (2013.01); *B29K 2105/08* (2013.01)

(56) References Cited

U.S. PATENT DOCUMENTS

| | | | |
|---|---|---|---|
| 8,678,809 B2 | 3/2014 | Suzuki et al. | |
| 9,914,268 B2 | 3/2018 | Coxon et al. | |
| 10,213,968 B2 | 2/2019 | Knutson | |
| 10,239,251 B2 | 3/2019 | Deck et al. | |
| 10,875,232 B2 | 12/2020 | Sundquist et al. | |
| 2009/0065977 A1 | 3/2009 | Suzuki et al. | |
| 2010/0263789 A1 | 10/2010 | Graeber | |
| 2012/0175049 A1 | 7/2012 | Suzuki et al. | |
| 2014/0027960 A1 | 1/2014 | Fujita et al. | |
| 2014/0103571 A1* | 4/2014 | Karb | B29C 70/541 425/111 |
| 2015/0174844 A1 | 6/2015 | Brizon et al. | |
| 2015/0328844 A1 | 11/2015 | Murakami et al. | |
| 2015/0352795 A1 | 12/2015 | Coxon et al. | |
| 2015/0367583 A1 | 12/2015 | Blot et al. | |
| 2016/0121589 A1 | 5/2016 | Pham et al. | |
| 2017/0210054 A1 | 7/2017 | Deck et al. | |
| 2017/0252982 A1 | 9/2017 | Knutson | |
| 2018/0281269 A1 | 10/2018 | Sundquist et al. | |

FOREIGN PATENT DOCUMENTS

| | | |
|---|---|---|
| JP | H07102609 B2 | 11/1995 |
| JP | 2934437 B1 | 8/1999 |
| JP | 2010115867 A | 5/2010 |
| JP | 2011505281 A | 2/2011 |
| JP | 4867917 B2 | 2/2012 |
| JP | 2012121227 A | 6/2012 |
| JP | 2014152760 A | 8/2014 |
| JP | 2015231740 A | 12/2015 |
| JP | 2016124125 A | 7/2016 |
| JP | 2017140827 A | 8/2017 |
| JP | 2017193164 A | 10/2017 |
| JP | 2018176737 A | 11/2018 |
| WO | 2018046908 A2 | 3/2018 |

OTHER PUBLICATIONS

Office Action for Japanese Application No. 2018-231137 mailed May 10, 2022; 9pp.

Extended European Search Report of European Application No. 19897299.4 mailed Nov. 17, 2021; 9pp.

* cited by examiner

MOLDING METHOD AND MOLDING JIG FOR LAMINATED BODY

RELATED APPLICATIONS

The present application is a National Phase of International Application Number PCT/JP2019/040894 filed Oct. 17, 2019 and claims priority of Japanese Application Number 2018-231137 filed Dec. 10, 2018.

TECHNICAL FIELD

The present invention relates to a forming method for a laminated body and a forming jig for a laminated body.

BACKGROUND ART

In the related art, there are known a forming system and method for defining the surface contour of a layered body by deforming the layered body from an initial form to a final form (refer to, for example, PTL 1). In the forming system and method, buckling or folds that occur when deforming the layered body are suppressed. In the forming system and method, the layered body is disposed on a forming surface of a forming die and a support surface of a fluid-operated support part. Then, in the forming system and method, the fluid-operated support part is compressed and the support surface is translated with respect to the forming surface to deform the layered body and define a desired surface contour.

CITATION LIST

Patent Literature

[PTL 1] Japanese Unexamined Patent Application Publication No. 2015-231740

SUMMARY OF INVENTION

Technical Problem

Incidentally, for example, in a case where a laminated body such as a layered body that is formed by laminating reinforced fiber base materials is deformed from a flat plate shape to a shape having a curved portion, there is a possibility that forming defects such as a ridge (thickening) or fiber meandering (wrinkles) may occur in the curved portion. In the forming system and method of PTL 1, although buckling or folds that occur when deforming the layered body are suppressed, there is a possibility that forming defects may occur in the curved portion.

Therefore, the present invention has an object to provide a forming method and a forming jig for a laminated body, in which it is possible to suppress occurrence of forming defects and appropriately deform the laminated body into a shape having a curved portion.

Solution to Problem

According to an aspect of the present invention, there is provided a forming method for a laminated body including: a lamination step of laminating reinforced fiber base materials on a forming surface of a forming jig to form a laminated body; an attachment step of attaching a pulling jig for applying tension, to an end portion of the laminated body; a deformation step of forming a curved portion in the laminated body by bending the laminated body along a curved surface formed on the forming surface while pulling the end portion of the laminated body with the pulling jig; and a densification step of densifying the laminated body by heating the curved laminated body while pressurizing the curved laminated body, in which in the lamination step, the reinforced fiber base materials are laminated such that in the curved portion formed in the laminated body, at least a part of a gap between layers of the reinforced fiber base materials is in a non-adhered state in the deformation step.

According to this configuration, in the deformation step, the end portion of the laminated body is pulled and the laminated body can be deformed while causing interlayer slip of the reinforced fiber base materials in the curved portion when the laminated body is curved, and therefore, it is possible to suppress the occurrence of forming defects such as thickening and wrinkles in the curved portion of the laminated body. As the shape of the laminated body having a curved portion, there is, for example, an L-shape having one curved portion, a Z-shape having two curved portions bent in different directions, a U-shape having two curved portions bent in the same direction, or the like. Further, in the lamination step, all the gaps between the layers of the reinforced fiber base materials in the curved portion may be in a non-adhered state or may be in a non-adhered state for each predetermined layers, and there is no particular limitation. Further, in the lamination step, all the gaps between the layers of the reinforced fiber base materials other than the curved portion may be in an adhered state or may be in a non-adhered state for each predetermined layers, and there is no particular limitation.

Further, it is preferable that the forming surface includes, as the curved surface, a convex curved surface that is convex to an outside of the forming surface, and a concave curved surface that is concave to an inside of the forming surface, and in the deformation step, a convex curved portion is formed in the laminated body by bending the laminated body along the convex curved surface while pulling the end portion of the laminated body by the pulling jig, and a concave curved portion is formed in the laminated body by pressing the laminated body against the concave curved surface by using a die material while pulling the end portion of the laminated body by the pulling jig.

According to this configuration, it is possible to form a Z-shaped laminated body in which the convex curved portion and the concave curved portion in two different directions are formed. At this time, due to using the die material, even in a case of forming the concave curved portion, it is possible to suppress the occurrence of forming defects such as swelling in the concave curved portion.

Further, it is preferable that the pulling jig has elasticity at an environmental temperature in the deformation step and is plastically deformed at a heating temperature in the densification step.

According to this configuration, at the time of the deformation step, by appropriately applying tension to the laminated body with the pulling jig, it is possible to suppress thickening or wrinkles. On the other hand, in the densification step, the pulling jig is plastically deformed, whereby it is possible to relax the tension on the laminated body, and therefore, it is possible to appropriately pressurize and density the laminated body in a state of following the curved surface.

Further, it is preferable that in the attachment step, the laminated body is fixed to the forming jig by a fixing part that fixes an end portion on the side opposite to an end portion of the laminated body that is pulled by the pulling jig.

According to this configuration, since the fixing part can take charge of a reaction force against the tension that is applied to the laminated body, the curved portion can be formed in the laminated body without a shift of the laminated body grounded to the forming jig. The fixing part is a fixing jig for fixing the laminated body to the forming jig, or a pulling jig that is attached to the opposite end portion of the laminated body.

Further, it is preferable that in the deformation step, the end portion of the laminated body is slid through a contact friction reducing element provided on the forming surface with which the end portion of the laminated body comes into contact.

According to this configuration, it is possible to restrain the formation of the curved portion of the laminated body from being hindered by a frictional force that is generated due to the contact of the end portion of the laminated body with the forming surface. The contact friction reducing element is a rotating body or the like.

According to another aspect of the present invention, there is provided a forming jig including: a forming jig main body having a forming surface; a pulling jig that is attached to an end portion of a laminated body disposed on the forming surface to apply tension to the laminated body; and a pressurizing part that pressurizes the laminated body toward the forming surface, in which the forming surface includes a curved surface for forming a curved portion in the laminated body.

According to this configuration, by bending the laminated body along the curved surface while pulling the end portion of the laminated body with the pulling jig, it is possible to suitably form the curved portion of the laminated body while suppressing the occurrence of forming defects such as thickening and wrinkles.

Further, it is preferable that the forming jig further includes a support jig having a support surface that supports an end portion of the laminated body disposed on the forming surface, and the support jig is provided to be attachable to and detachable from the forming jig main body.

According to this configuration, a case of forming the laminated body, the support jig is installed at the forming jig main body, and then the laminated body can be formed on the forming surface and the support surface. Further, in a case of bending the laminated body, a curved portion can be formed in the laminated body by removing the support jig from the forming jig main body and then moving the portion of the laminated body facing the support surface.

Further, it is preferable that the forming surface includes, as the curved surface, a convex curved surface that is convex to an outside of the forming surface, and a concave curved surface that is concave to an inside of the forming surface, and the forming jig further includes a die material that presses the laminated body against the concave curved surface.

According to this configuration, it is possible to form a Z-shaped laminated body having a convex curved portion that is formed by the convex curved surface and a concave curved portion that is formed by the concave curved surface. At this time, due to using the die material, even in a case of forming the concave curved portion, it is possible to suppress the occurrence of forming defects in the concave curved portion.

Further, it is preferable that the forming further includes a positioning member that positions the die material with respect to the concave curved surface.

According to this configuration, since the position of the die material with respect to the concave curved surface can be set to an appropriate position, the concave curved portion to be formed in the laminated body can be formed at an appropriate position.

Further, it is preferable that the forming further includes a fixing jig that fixes a part of the laminated body to the forming jig main body.

According to this configuration, since it is possible to bend the laminated body while fixing a part of the laminated body to the forming jig main body by the fixing jig, the curved portion can be formed at an appropriate position of the laminated body.

Further, it is preferable that the forming jig further includes a contact friction reducing element that is provided on the forming surface with which the end portion of the laminated body comes into contact.

According to this configuration, it is possible to restrain the formation of the curved portion of the laminated body from being hindered by a frictional force that is generated due to the contact of the end portion of the laminated body with the forming surface.

DESCRIPTION OF EMBODIMENTS

Hereinafter, embodiments according to the present invention will be described in detail based on the drawings. The present invention is not limited by the embodiments. Further, constituent elements in the following embodiments include those that can be easily replaced by those skilled in the art, or those that are substantially equal to the constituent elements. Further, the constituent elements described below can be appropriately combined with each other, and in a case where there are a plurality of embodiments, the respective embodiments can be combined with each other.

Embodiment 1

A forming jig 10 according to this embodiment is a jig that is used when forming a laminated body 5 in which a plurality of reinforced fiber base materials are laminated. The forming method for the laminated body 5 using the forming jig 10 is a method of forming the laminated body 5 having a curved portion by bending the laminated body 5 laminated so as to have a substantially flat plate shape. In Embodiment 1, the laminated body 5 is formed in a Z-shaped laminated body 5 that includes, as the curved portion, a convex curved portion that is convex with respect to the upper surface of the laminated body and a concave curved portion that is concave with respect to the upper surface of the laminated body 5. In Embodiment 1, description will be made to be applied to the Z-shaped laminated body 5. However, as long as it is the laminated body 5 having a curved portion, a laminated body having any shape may be adopted, and for example, an L-shape having one curved portion, or a U-shape having two curved portions bent in the same direction may be adopted.

Figure 1:
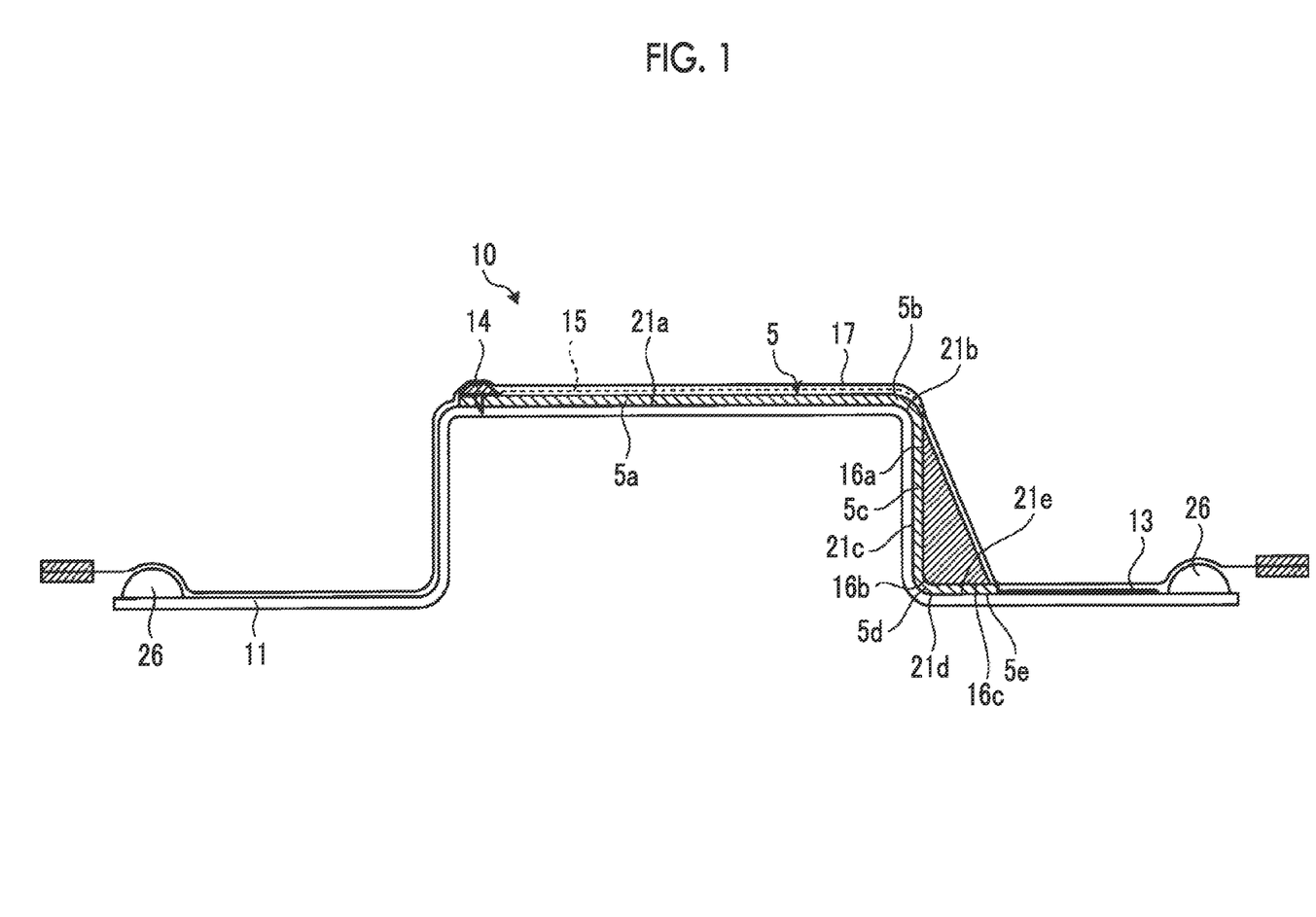
FIG. 1 is a side view of a forming jig according to Embodiment 1.
Figure 2:
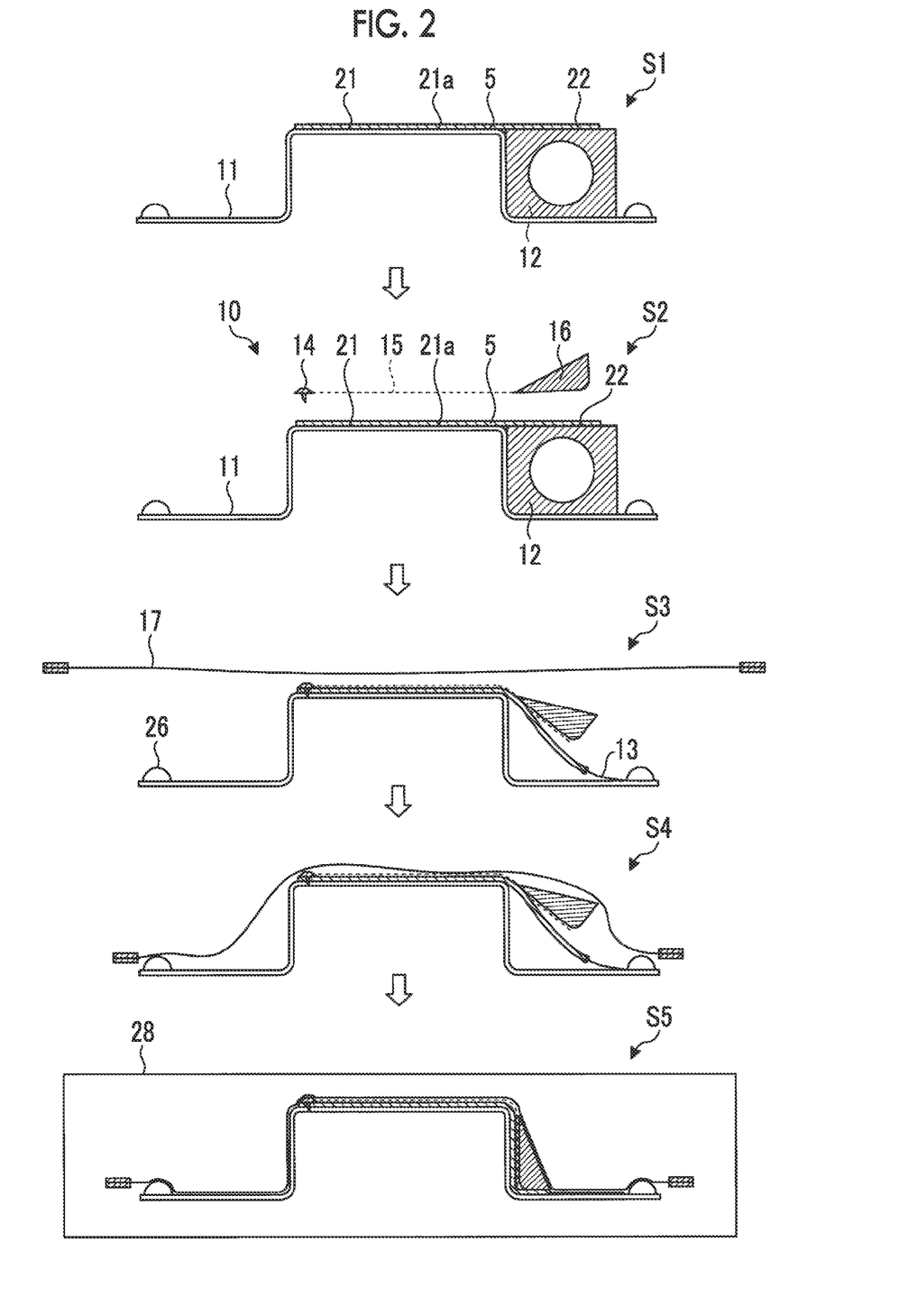
FIG. 2 is an explanatory view related to a forming method for a laminated body according to Embodiment 1.
Figure 3:
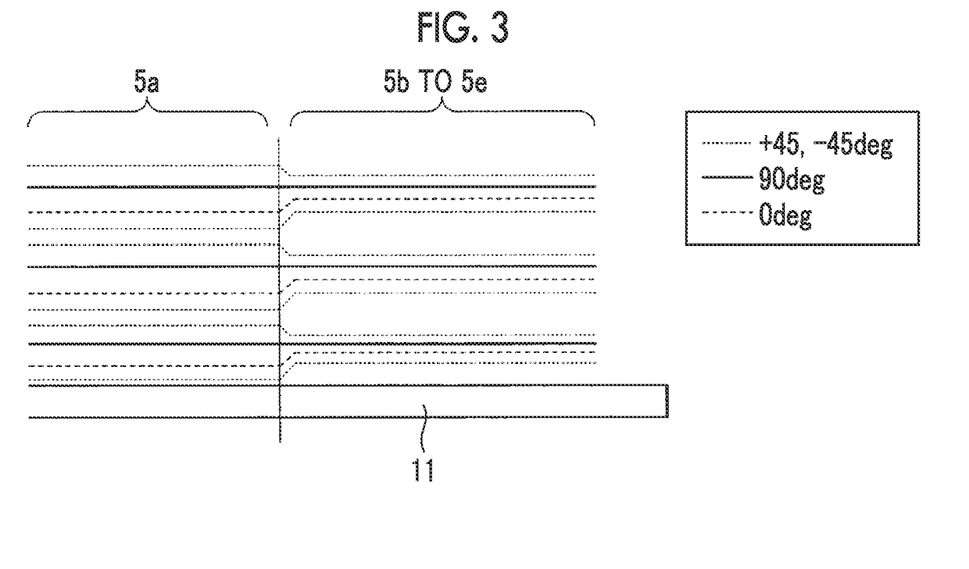
FIG. 3 is an explanatory view showing a laminated body laminated according to Embodiment 1.
Figure 4:
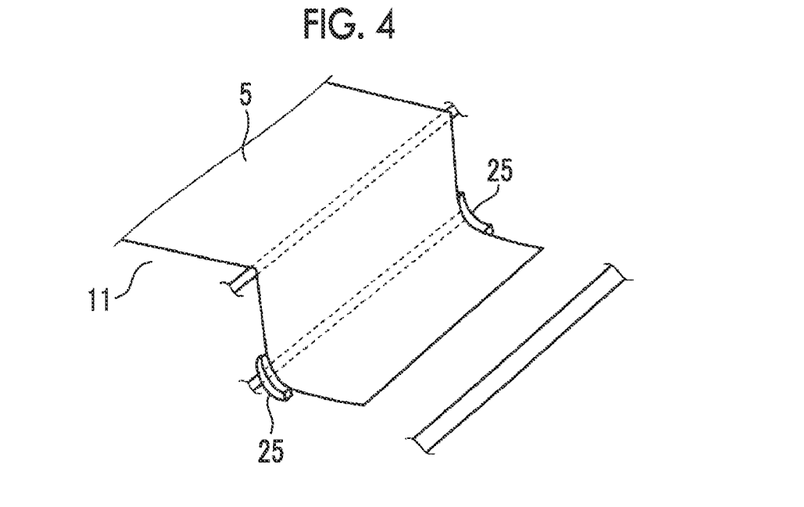
FIG. 4 is a perspective view schematically showing a part of the forming jig according to Embodiment 1.

FIG. 1 is a side view of the forming jig according to Embodiment 1. FIG. 2 is an explanatory view related to the forming method for a laminated body according to Embodiment 1. FIG. 3 is an explanatory view showing the laminated body laminated according to Embodiment 1. FIG. 4 is a perspective view schematically showing a part of the forming jig according to Embodiment 1.

First, the laminated body 5 will be described with reference to FIG. 1. The laminated body 5 is formed by laminating a plurality of reinforced fiber base materials in a dry state, which are not impregnated with resin. Further, the reinforced fiber base material a base material formed in a sheet shape. As the reinforced fiber, for example, a carbon fiber is used. However, it is not limited to the carbon fiber, and other plastic fiber, glass fiber, natural fiber, or metal fiber may be used. In Embodiment 1, a reinforced fiber base material in a dry state is applied. However, a prepreg as a reinforced fiber base material impregnated with resin may be applied.

The laminated body 5 is formed by laminating the reinforced fiber base materials on a forming surface 21 and a support surface 22 of the forming jig 10. The laminated body 5 after lamination and before deformation has a shape that follows the forming surface 21 and the support surface 22, and has a substantially flat plate shape. As the substantially flat plate shape, there for example, a flat plate shape having a flat surface, an arch shape having a gentle curved surface, or the like. The laminated body 5 after deformation has a Z-shape, and specifically, it includes a first laminated portion 5a, a convex curved portion 5b, a second laminated portion 5c, a concave curved portion 5d, and a third laminated portion 5e.

The first laminated portion 5a is a portion that is fixed when the laminated body 5 is deformed, and is a portion that not deformed before and after the deformation of the laminated body 5. Therefore, the first laminated portion 5a has a substantially flat plate shape. The first laminated portion 5a is a portion on one side (the left side in FIG. 1) of the laminated body 5, and is a portion that occupies more than half of the laminated body 5.

The convex curved portion 5b is a portion formed between the first laminated portion 5a and the second laminated portion 5c. The convex curved portion 5b is a portion that is deformed when the laminated body 5 is deformed, and is a portion that is curved to protrude (be convex) to the outside with respect to the forming surface 21 of the forming jig 10 (described later).

The second laminate portion 5c is a portion extending in a direction intersecting (almost orthogonal to) the first laminated portion 5a, and is located between the first laminated portion 5a and the third laminated portion 5e. The second laminated portion 5c is a portion where interlayer slip occurs when the laminated body 5 is deformed.

The concave curved portion 5d is a portion formed between the second laminated portion 5c and the third laminated portion 5e. The concave curved portion 5d is a portion that is deformed when the laminated body 5 is deformed, and is a portion that is curved to be recessed (be concave) to the inside with respect to the forming surface 21 of the forming jig 10 (described later).

The third laminated portion 5e is a portion on the other side (the right side in FIG. 1) of the laminated body 5. The third laminated portion 5e is a portion where interlayer slip occurs when the laminated body 5 is deformed. The third laminated portion 5e is substantially parallel to the first laminated portion 5a.

Next, the forming jig 10 for forming the laminated body 5 will be described with reference to FIG. 1. The forming jig 10 is used for forming the laminated body 5 having a substantially flat plate shape before deformation, and is used for deforming the substantially flat plate-shaped laminated body 5 to form the Z-shaped laminated body 5 having the convex curved portion 5b and the concave curved portion 5d.

The forming jig 10 is provided with a forming jig main body 11, a support jig 12, a pulling jig 13, a clasp (fixing) 14, a connection band 15, a triangular die material (die material) 16, and a bladder bag (pressurizing part) 17.

The forming jig main body 11 has a shape in which the central portion protrudes upward and both end portions are located on the lower side with respect to the central portion within a horizontal plane. In the forming jig main body 11, the upper surfaces of the central portion and the end portion on the other side (the right side in FIG. 1) serve as the forming surface 21. The forming jig main body 11 forms the laminated body 5 into a Z-shape by deforming the laminated body 5 in accordance with the forming surface 21. The forming surface 21 is a forming surface having a step, and includes a first forming surface 21a, a convex curved surface 21b, a second forming surface 21c, a concave curved surface 21d, and a third forming surface 21e.

The first forming surface 21a is a forming surface for fixing the laminated body 5 when the laminated body 5 is deformed, and is formed at the central portion of the forming jig main body 11. The first forming surface 21a is located on the upper side in the vertical direction with respect to the third forming surface 21e. Further, the first forming surface 21a is a flat surface in the horizontal direction. The first forming surface 21a is not particularly limited to a flat surface and may be an inclined surface or a curved surface.

The convex curved surface 21b is a surface that is formed between the first forming surface 21a and the second forming surface 21c and is curved to protrude (be convex) to the outside with respect to the forming surface 21. The convex curved surface 21b is a surface for forming the convex curved portion 5b in the laminated body 5.

The second forming surface 21c is a wall surface along the vertical direction, and is located between the first forming surface 21a and the third forming surface 21e in the horizontal direction (a right-left direction in FIG. 1).

The concave curved surface 21d is a surface that is formed between the second forming surface 21c and the third forming surface 21e and is curved to be recessed (be concave) to the inside with respect to the forming surface 21. The concave curved surface 21d is a surface for forming the concave curved portion 5d in the laminated body 5.

The third forming surface 21e is formed on the other side (the right side in FIG. 1) of the forming jig main body 11. The third forming surface 21e is located on the lower side in the vertical direction with respect to the first forming surface 21a.

The forming jig main body 11 forms the Z-shaped laminated body 5 in which the laminated body 5 is formed in accordance with the forming surface 21, so that the convex curved portion 5b and the concave curved portion 5d are formed.

The support jig 12 is attachable to and detachable from the forming jig main body 11. The support jig 12 is a jig that is used when the laminated body 5 is formed by laminating the reinforced fiber base materials, and is removed when the laminated body 5 is deformed. The upper surface of the support jig 12 serves as the support surface 22. The support surface 22 is a surface on an extension of the first forming surface 21a, and the laminated body 5 is laminated on the first forming surface 21a of the forming jig main body 11 and the support surface 22 of the support jig 12. The support jig 12 is disposed on the third forming surface 21e of the forming jig main body 11. The support jig 12 has a surface having a shape complementary to the surface from the second forming surface 21c to the third forming surface 21e via the concave curved surface 21d. The support jig 12 is disposed in contact with the second forming surface 21c, the concave curved surface 21d, and the third forming surface 21e of the forming jig main body 11 without gaps, so that it is disposed in a state where the position thereof is restricted at a predetermined position.

The pulling jig 13 is attached to the end portion of the third laminated portion 5e of the laminated body 5 to apply tension to the laminated body 5. That is, one end of the pulling jig 13 is attached to the end portion of the third laminated portion 5e of the laminated body 5, and the other end is attached to the forming jig main body 11. Therefore, the pulling jig 13 connects the laminated body 5 and the forming jig main body 11. The pulling jig 13 has elasticity at an environmental temperature in a deformation step of the forming method (described later), and is plastically deformed at a heating temperature in a densification step. That is, the pulling jig 13 applies tension to the laminated body 5 in the deformation step. On the other hand, since the pulling jig 13 is plastically deformed in the densification step, the tension on the laminated body 5 is reduced as compared with that in the deformation step.

The clasp 14 is for fixing the laminated body 5 to the forming jig main body 11. The clasp 14 is fixed to the forming jig main body 11 with the laminated body 5 interposed therebetween. Specifically, the clasp 14 has a head portion and a shaft portion, and the shaft portion penetrates the first laminated portion 5a of the laminated body 5 and is fastened to a fastening hole formed in the first forming surface 21a of the forming jig main body 11, whereby the laminated body 5 is fastened and fixed with it sandwiched between the clasp 14 and the first forming surface 21a.

The connection band 15 is a member that connects the clasp 14 and the triangular die material 16. The connection band 15 has such a length that the clasp 14 and the triangular die material 16 have a predetermined positional relationship. Specifically, the connection band 15 has such a length that the triangular die material 16 is located to face the concave curved surface 21d of the forming jig main body 11. Therefore, the connection band 15 functions as a positioning member for positioning the triangular die material 16 with respect to the concave curved surface 21d.

The triangular die material 16 is a die material that presses the laminated body 5 against the concave curved surface 21d of the forming jig main body 11. The triangular die material 16 has a triangular cross section when viewed in a side view. The triangular die material has a first facing surface 16a facing the second forming surface 21c of the forming jig main body 11, a curved facing surface 16b facing the concave curved surface 21d, and a second facing surface 16c facing the third forming surface 21e. The curved facing surface 16b has a smaller radius of curvature than the concave curved surface 21d. That is, the curved facing surface 16b has a steeper curve than the concave curved surface 21d.

As shown in FIG. 4, a pair of spacers 25 is provided on both sides in a width direction of the laminated body 5 between the forming jig main body 11 and the triangular die material 16. The width direction of the laminated body 5 is a direction orthogonal to the direction in which the laminated body 5 is pulled by the pulling jig 13. The thickness of each spacer 25 is substantially the same as the thickness of the laminated body 5. Each spacer 25 is disposed at the concave curved surface 21d of the forming jig main body 11.

The bladder bag 17 is a covering member that covers the laminated body 5 disposed on the forming jig main body 11. The bladder bag 17 covers the forming jig main body together with the laminated body 5 through a seal member 26 provided on the forming surface 21 of the forming jig main body 11. The bladder bag 17 forms an internal space airtightly sealed by the seal member 26 between the bladder bag 17 and the forming jig main body 11. The bladder bag 17 is pressed toward the forming jig main body 11 by atmospheric pressure due to vacuum suction of the internal space, thereby pressing the laminated body 5.

Next, the forming method for the laminated body 5 using the forming jig 10 will be described with reference to FIG. 2. In the forming method for the laminated body 5, the laminated body 5 is formed by laminating the reinforced fiber base materials on the forming jig 10, and the formed laminated body 5 is deformed into the Z-shaped laminated body 5.

As shown in FIG. 2, the forming jig 10 is in a state where the support jig 12 is installed at the forming jig main body 11. In the forming method, first, the laminated body 5 is formed by laminating the reinforced fiber base materials on the forming surface 21 and the support surface 22 of the forming jig 10 (step S1: lamination step). Specifically, in the lamination step S1, the laminated body 5 is formed over the first forming surface 21a of the forming surface 21 and the support surface 22. In the lamination step S1, the reinforced fiber base materials are laminated such that at least a part of a gap between the layers of the reinforced fiber base materials is in a non-adhered state in the convex curved portion 5b that is formed in the laminated body 5.

FIG. 3 shows a part of the laminated body 5 laminated in the lamination step S1. As shown in FIG. 3, the reinforced fiber base materials are laminated with different fiber directions. The lamination is, for example, isotropic lamination, and in a case where a predetermined fiber direction is set to 0°, the reinforced fiber base materials are laminated so as to become 0°, ±45°, and 90°. Further, in the lamination step S1, all the layers of the reinforced fiber base materials are adhered to each other in the first laminated portion 5a of the laminated body 5. The reinforced fiber base materials may be bonded to each other, for example, by spraying a liquid adhesive between the layers of the reinforced fiber base materials and then pressing the reinforced fiber base materials, the layers may be welded to each other by heating a thermoplastic resin in the form of powder, a non-woven fabric, or the like welded to the surface of the reinforced fiber base material in advance while pressing the resin, and there is no particular limitation.

On the other hand, in the lamination step S1, in the convex curved portion 5b, the second laminated portion 5c, the concave curved portion 5d, and the third laminated portion 5e of the laminated body 5 (the portions from the convex curved portion 5b to the third laminated portion 5e of the laminated body 5), at least a part of a gap between the layers of the reinforced fiber base materials is in a non-adhered state. The portions from the convex curved portion 5b to the third laminated portion 5e of the laminated body 5 include layers which are in a non-adhered state for each four layers, for example.

In the lamination step S1 of Embodiment 1, in the portions from the convex curved portion 5b to the third laminated portion 5e of the laminated body 5, the layers which are in a non-adhered state for each predetermined layer are provided. However, all the layers may be in a non-adhered state.

Next, the laminated body 5 laminated on the forming surface 21 and the support surface 22 of the forming jig 10 is fixed to the forming jig main body 11 by using the clasp 14 and the support jig 12 then removed (step S2). In step S2, the shaft portion of the clasp 14 penetrates the first laminated portion 5a of the laminated body 5 and is fastened to the fastening hole formed in the first forming surface 21a of the forming jig main body 11, whereby the laminated body 5 is fastened and fixed with it sandwiched between the head of the clasp 14 and the forming jig main body 11. By fixing the clasp 14, the triangular die material 16 connected through the connection band 15 is located at a predetermined position according to the length of the connection band 15. Further, in step S2, the support jig 12 is removed, so that the portion of the laminated body 5 facing the support surface 22 is made movable. That is, the portion of the laminated body 5 facing the support surface 22 becomes a portion that moves when the laminated body 5 is deformed.

Subsequently, the pulling jig 13 is attached to an end portion of the laminated body 5 and the bladder bag 17 is mounted so as to cover the laminated body 5 (step S3: attachment step). In the attachment step S3, one end of the pulling jig 13 is attached to an end portion of the third laminated portion 5e of the laminated body 5, and the other end of the pulling jig 13 is attached to the forming jig main body 11. At this time, the pulling jig 13 applies tension to the laminated body 5. Further, in the attachment step S3, the forming jig main body 11 is covered together with the laminated body 5 with the pulling jig 13 attached thereto.

Thereafter, the internal space formed between the forming jig main body 11 and the bladder bag 17 is vacuum-sucked, so that the laminated body 5 is deformed along the forming surface 21 while the laminated body 5 is pulled by the pulling jig 13 (step S4: deformation step). In the deformation step S4, the bladder bag 17 is pressed toward the forming surface 21 of the forming jig main body 11. In this way, in the deformation step S4, the first laminated portion 5a of the laminated body 5 is pressed by the bladder bag 17. Further, in the deformation step S4, the convex curved portion 5b, the second laminated portion 5c, the concave curved portion 5d, and the third laminated portion 5e of the laminated body 5 are pressed by the bladder bag 17 through the triangular die material 16.

At this time, in the deformation step S4, since the end portion of the laminated body 5 is pulled by the pulling jig 13, the laminated body 5 can be curved while causing interlayer slip in the portions from the convex curved portion 5b to the third laminated portion 5e of the laminated body 5. Then, due to the deformation step S4, the laminated body 5 becomes the Z-shaped laminated body 5 having the convex curved portion 5b and the concave curved portion 5d.

The curved laminated body 5 is accommodated in a heating furnace 28 such as an oven or an autoclave together with the forming jig 10. The laminated body 5 is densified by being heated while being pressurized in the heating furnace 28 (step S5: densification step). In the densification step S5, the pulling jig 13 is plastically deformed by being heated to a predetermined heating temperature. Therefore, in the densification step S5, the tensile load on the laminated body 5 by the pulling jig 13 is reduced. The densification step S5 is executed, so that the forming method for the laminated body 5 ends.

As described above, according to Embodiment 1, in the deformation step S4, the end portion of the laminated body 5 is pulled, and the laminated body 5 can be deformed while causing interlayer slip of the reinforced fiber base materials in the convex curved portion 5b and the concave curved portion 5d when the laminated body 5 is curved. Therefore, it is possible to suppress the occurrence of forming defects such as thickening and wrinkles in the convex curved portion 5b and the concave curved portion 5d of the laminated body 5.

Further, according to Embodiment 1, the concave curved portion 5d is formed using the triangular die material 16, whereby it is possible to form the Z-shaped laminated body 5 in which the convex curved portion 5b and the concave curved portion 5d are formed, while suppressing the occurrence of forming defects such as swelling in the concave curved portion 5d.

Further, according to Embodiment 1, at the time of the deformation step S4, tension can be appropriately applied to the laminated body 5 by the pulling jig 13. On the other hand, in the densification step S5, the pulling jig 13 is plastically deformed, so that the tension on the laminated body 5 can be relaxed. Therefore, the laminated body 5 can be appropriately pressurized and densified in a state of following the convex curved surface 21b and the concave curved surface 21d.

Further, according to Embodiment 1, the laminated body 5 can be curved while a part of the laminated body 5 is fixed to the forming jig main body 11 by the clasp 14. Therefore, since the clasp 14 can take charge of a reaction force against the tension that is applied to the laminated body 5, the convex curved portion 5b and the concave curved portion 5d can be formed at appropriate positions of the laminated body 5 without a shift of the laminated body 5 grounded to the forming jig 10.

Further, according to Embodiment 1, in a case of forming the laminated body 5, the support jig 12 is installed at the forming main body 11 and then the laminated body 5 can be formed on the forming surface 21 and the support surface 22. Further, in a case of bending the laminated body 5, the support jig 12 is removed from the forming jig main body 11, and then the convex curved portion 5b and the concave curved portion 5d can be formed in the laminated body 5 by moving the portion of the laminated body 5 facing the support surface 22.

Further, according to Embodiment 1, the clasp 14 and the triangular die material 16 are connected by the connection band 15, whereby the position of the triangular die material 16 with respect to the concave curved surface 21d can be set to an appropriate position, so that the concave curved portion 5d that is formed in the laminated body 5 can be formed at an appropriate position.

Further, according to Embodiment 1, since it is possible to bend the laminated body 5 while fixing the first laminated portion 5a of the laminated body 5 to the forming jig main body 11 by the clasp 14, the convex curved portion 5b and the concave curved portion 5*d* can be formed at appropriate positions of the laminated body 5.

In Embodiment 1, the description has been made to be applied to the reinforced fiber base material in a dry state. However, in a case where a prepreg is applied as the reinforced fiber base material, in the deformation step S4, it is preferable to make a gap between the layers be in a non-adhered state by heating a laminated body in which the prepregs are laminated, and then deform the laminated body.

Figure 5:
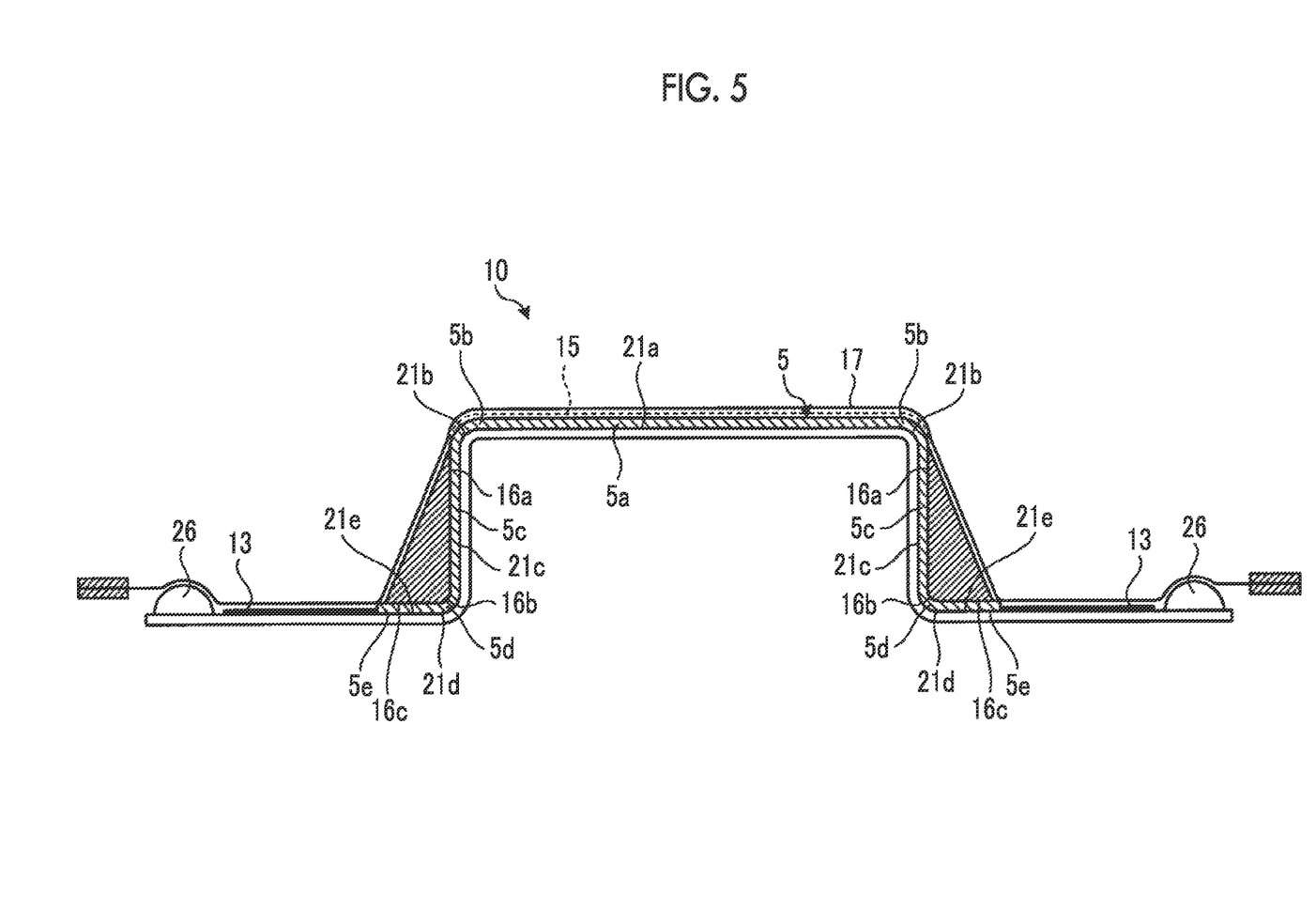
FIG. 5 is a side view of a forming jig according to another example of Embodiment 1.

Further, in Embodiment 1, the laminated body 5 is fixed to the forming jig main body 11 by using the clasp 14. However, the laminated body 5 may be fixed as shown in FIG. 5, for example. In the forming jig main body 11 of FIG. 5, the laminated body 5 has the portions from the convex curved portion 5*b* to the third laminated portion 5*e* provided at each of the end portions on both sides of the first laminated portion 5*a*, and the laminated body 5 is fixed to the forming jig main body 11 by applying tension by the pulling jigs 13 from both sides of the laminated body 5. The forming jig main body 11 of FIG. 5 has a configuration in which the configuration of the other side (the right side in FIG. 1) of the forming jig main body 11 of FIG. 1 is expanded on one side (the left side in FIG. 1) with the central portion interposed therebetween. Further, in FIG. 5, a configuration in which the clasp 14 is omitted may be made.

Further, in Embodiment 1, the laminated body 5 is formed on the forming surface 21 and the support surface 22 of the forming jig 10. However, after the laminated body 5 laminated in advance is disposed on the forming surface 21 of the forming jig 10, the laminated body 5 may be deformed. In this case, the forming jig 10 may have a configuration in which the support jig 12 is omitted.

Embodiment 2

Figure 6:
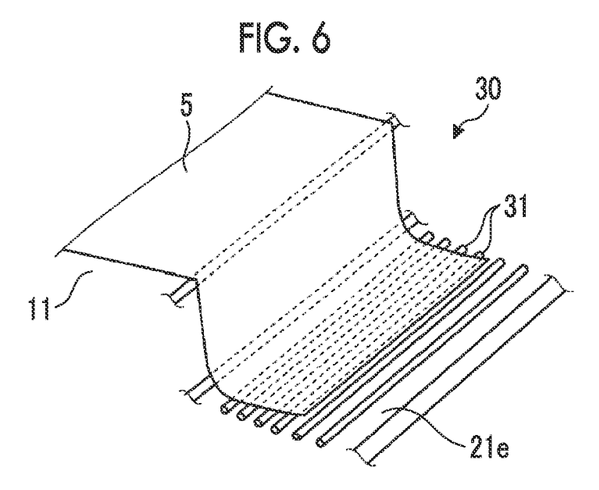
FIG. 6 is a perspective view schematically showing a part of a forming jig according to Embodiment 2.

Next, a forming jig 30 according to Embodiment 2 will be described with reference to FIG. 6 FIG. 6 is a perspective view schematically showing a part of the forming jig according to Embodiment 2. In Embodiment 2, in order to avoid overlapping description, portions different from those in Embodiment 1 will be described, and portions having the same configurations as those in Embodiment 1 will be described with them denoted by the same reference numerals.

The forming jig 30 of Embodiment 2 has configuration in which a roller 31 as a rotating body (contact friction reducing element) with which the end portion of the laminated body 5 comes into contact is further provided at the forming jig 10 of Embodiment 1. A plurality of rollers 31 are provided on the third forming surface 21*e* of the forming jig main body 11. Each roller 31 is rotatable in a direction in which the third laminated portion 5*e* of the laminated body 5 moves to the concave curved surface 21*d*.

Therefore, in the deformation step S4 using the forming 30, even in a case where the third laminated portion 5*e* of the laminated body 5 comes into contact with the third forming surface 21*e*, the third laminated portion 5*e* of the laminated body 5 slides and moves toward the concave curved surface 21*d* due to the plurality of rollers 31.

As described above, according to Embodiment 2, it is possible to restrain the formation of the convex curved portion 5*b* and the concave curved portion 5*d* of the laminated body 5 from being hindered by the frictional force that is generated due to the contact of the third laminated portion 5*e* of the laminated body 5 with the third forming surface 21*e*.

Embodiment 3

Figure 7:
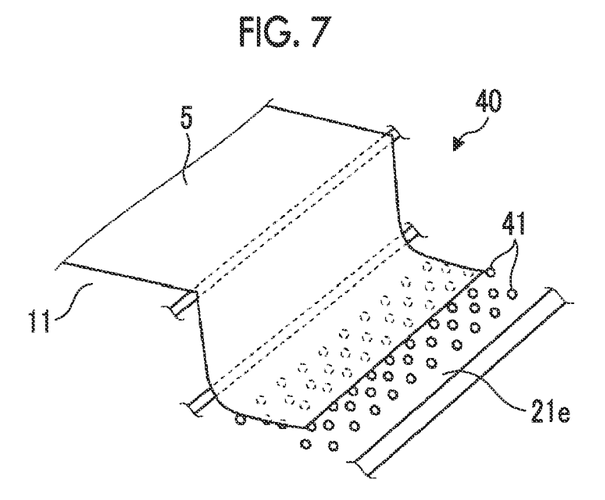
FIG. 7 is a perspective view schematically showing a part of a forming jig according to Embodiment 3.

Next, a forming jig 40 according to Embodiment 3 will be described with reference to FIG. 7 FIG. 7 is a perspective view schematically showing a part of the forming jig according to Embodiment 3. In Embodiment 3, in order to avoid overlapping description, portions different from those in Embodiments 1 and 2 will be described, and portions having the same configurations as those in Embodiments 1 and 2 will be described with them denoted by the same reference numerals.

The forming jig 40 of Embodiment 3 has a configuration in which a roller ball 41 as a rotating body (contact friction reducing element) with which the end portion of the laminated body 5 comes into contact is further provided at the forming jig 10 of Embodiment 1. A plurality of roller balls 41 are provided on the third forming surface 21*e* of the forming jig main body 11. Each roller ball 41 is rotatable in any direction.

Therefore, in the deformation step S4 using the forming jig 40, even in a case where the third laminated portion 5*e* of the laminated body 5 comes into contact with the third forming surface 21*e*, the third laminated portion 5*e* of the laminated body 5 slides and moves toward the concave curved surface 21*d* due to the plurality of roller balls 41.

As described above, according to Embodiment 3, it is possible to restrain the formation of the convex curved portion 5*b* and the concave curved portion 5*d* of the laminated body 5 from being hindered by the frictional force that is generated due to the contact of the third laminated portion 5*e* of the laminated body 5 with the third forming surface 21*e*.

REFERENCE SIGNS LIST

5: laminated body
5*a*: first laminated portion
5*b*: convex curved portion
5*c*: second laminated portion
5*d*: concave curved portion
5*e*: third laminated portion
10: forming jig
11: forming jig main body
12: support jig
13: pulling jig
14: clasp
15: connection band
16: triangular the material
16*a*: first facing surface
16*b*: curved facing surface
16*c*: second facing surface
17: bladder bag
21: forming surface
21*a*: first forming surface
21*b*: convex carved surface
21*c*: second forming surface
21*d*: concave carved surface
21*e*: third forming surface
22: support surface
25: spacer
26: seal member
28: heating furnace
30: forming (Embodiment 2)
31: roller
40: forming jig (Embodiment 3)
41: roller ball

The invention claimed is:

1. A forming method for a laminated body comprising:
   a lamination step of laminating reinforced fiber base materials on a forming surface of a forming jig to form a laminated body;
   an attachment step of attaching a pulling jig for applying tension, to an end portion of the laminated body;
   a deformation step of forming a curved portion in the laminated body by bending the laminated body along a curved surface formed on the forming surface while pulling the end portion of the laminated body with the pulling jig; and
   a densification step of densifying the laminated body by heating the curved laminated body while pressurizing the curved laminated body,
   wherein in the lamination step, the reinforced fiber base materials are laminated such that in the curved portion formed in the laminated body, at least a part of adjacent layers of the reinforced fiber base materials is in a non-adhered state in the deformation step,
   wherein the forming surface includes, as the curved surface, a convex curved surface that is convex to an outside of the forming surface, and a concave curved surface that is concave to an inside of the forming surface, and
   in the deformation step, a convex curved portion is formed in the laminated body by bending the laminated body along the convex curved surface while pulling the end portion of the laminated body by the pulling jig, and a concave curved portion is formed in the laminated body by pressing the laminated body against the concave curved surface by using a die material while pulling the end portion of the laminated body by the pulling jig,
   wherein the die material is fixed to the forming jig via a positioning member having a predetermined length such that a convex portion of the die material fits into the concave curved surface of the forming surface.

2. The forming method for a laminated body according to claim 1, wherein the pulling jig has elasticity at an environmental temperature in the deformation step and is plastically deformed at a heating temperature in the densification step.

3. The forming method for a laminated body according to claim 1, wherein in the attachment step, the laminated body is fixed to the forming jig by a fixing part that fixes an end portion on a side opposite to the end portion of the laminated body that is pulled by the pulling jig.

4. The forming method for a laminated body according to claim 1, wherein in the deformation step, the end portion of the laminated body is slid through a contact friction reducing element provided on the forming surface with which the end portion of the laminated body comes into contact.

5. The forming method for a laminated body according to claim 1,
   wherein the positioning member includes, a first portion fixed to the forming jig, and a second portion fixed to the die material,
   wherein the predetermined length is a distance from the first portion to the second portion.

* * * * *